United States Patent
Asbrand et al.

(10) Patent No.: US 9,339,969 B2
(45) Date of Patent: May 17, 2016

(54) BLOW MOULDING MACHINE WITH VARIABLE INTERMEDIATE PRESSURE LEVEL

(71) Applicant: KRONES AG, Neutraubling (DE)

(72) Inventors: Helmut Asbrand, Bad Abbach (DE); Ulrich Lappe, Neutraubling (DE); Oliver Apfelbacher, Edelsfeld (DE); Alexander Dachs, Regensburg (DE)

(73) Assignee: KRONES AG (DE)

( * ) Notice: Subject to any disclaimer, the term of this patent is extended or adjusted under 35 U.S.C. 154(b) by 174 days.

(21) Appl. No.: 14/059,161

(22) Filed: Oct. 21, 2013

(65) Prior Publication Data

US 2014/0110873 A1   Apr. 24, 2014

(30) Foreign Application Priority Data

Oct. 19, 2012 (DE) .......................... 10 2012 110 023

(51) Int. Cl.
| | |
|---|---|
| *B29C 49/78* | (2006.01) |
| *B29C 49/18* | (2006.01) |
| *B29C 49/06* | (2006.01) |
| *B29C 49/12* | (2006.01) |
| *B29C 49/36* | (2006.01) |

(52) U.S. Cl.
CPC ............... *B29C 49/783* (2013.01); *B29C 49/18* (2013.01); *B29C 49/06* (2013.01); *B29C 49/12* (2013.01); *B29C 49/36* (2013.01); *Y02P 70/271* (2015.11)

(58) Field of Classification Search
None
See application file for complete search history.

(56) References Cited

U.S. PATENT DOCUMENTS

| | | | |
|---|---|---|---|
| 7,803,311 B2 | 9/2010 | Finger et al. | 264/526 |
| 7,892,477 B2 | 2/2011 | Hirdina | 264/529 |
| 8,550,805 B2 | 10/2013 | Hirdina | 425/535 |
| 2008/0191394 A1 | 8/2008 | Elliott | 264/259 |

FOREIGN PATENT DOCUMENTS

| | | | | |
|---|---|---|---|---|
| CN | 1938145 | 3/2007 | ............. | B29C 49/18 |
| DE | 102004014653 | 10/2005 | ............. | B29C 49/18 |
| DE | 102004041973 | 1/2006 | ............. | B29C 49/42 |
| DE | EP1974892 | 10/2008 | ............. | B29C 49/78 |
| DE | EP2298534 | 3/2011 | ............. | B29C 49/78 |
| DE | 102011110962 | 2/2013 | ............. | B29C 49/78 |
| EP | 1777056 | 4/2007 | ............. | B29C 49/78 |

(Continued)

OTHER PUBLICATIONS

Extended European Search Report dated Feb. 21, 2014 (9 pgs).

(Continued)

*Primary Examiner* — Monica Huson
(74) *Attorney, Agent, or Firm* — Hayes Soloway P.C.

(57) ABSTRACT

A method for the shaping of plastics material pre-forms into plastics material containers, wherein the plastics material pre-forms are introduced into a blow mould and are expanded to form the plastic bottles by being acted upon with a gaseous medium in the blow mould, includes the steps of:
  preliminary blow moulding by acting upon the plastics material pre-forms with a first pressure;
  intermediate blow moulding of the plastics material pre-forms at a second pressure which is higher than the first pressure; and
  final blow moulding of the plastics material pre-forms at a third pressure which is higher than the second pressure, wherein
at least the second pressure is varied during a working operation.

14 Claims, 1 Drawing Sheet

(56) References Cited

FOREIGN PATENT DOCUMENTS

| | | | | |
|---|---|---|---|---|
| EP | 1905569 | 4/2008 | ............. | B29C 49/78 |
| WO | WO2009/004472 | 1/2009 | ............. | B29C 49/66 |

OTHER PUBLICATIONS

German Search Report (no translation) issued in corresponding application No. 10 2012 110 023.3, dated Apr. 30, 2013 (5 pgs).

Chinese Office Action (translated) issued in application No. 2013104953897, dated Jul. 28, 2015 (4 pgs).

BLOW MOULDING MACHINE WITH VARIABLE INTERMEDIATE PRESSURE LEVEL

BACKGROUND OF THE INVENTION

The present invention relates to a method and an apparatus for the shaping of plastics material pre-forms into plastics material containers. Apparatus of this type have long been known from the prior art.

In recent years it has also become known in this case for blow moulding machines of this type, and also in particular stretch blow moulding machines, to be provided with air recycling systems. In this case it is possible for plastics material pre-forms to be acted upon with different pressure levels for the expansion thereof, and in this way compressed air can possibly be recovered again. A presently current machine of the Applicants has in this case two pressure ducts which are capable of being recycled. These are a pressure duct which provides available a preliminary blow moulding pressure and a pressure duct which provides an intermediate blow moulding pressure. In particular, the level of the so-called intermediate blow moulding significantly influences the air consumption, in which case, however, an ideal air consumption can be predicted only with difficulty.

DE 10 2004 041 973 B3 describes an air recycling in a blow moulding process. In this case an aeration of the container with respect to an environmental pressure is carried out after a transition phase and a pressure control in the lower compressed air supply is carried out by a variation in the duration of this transition phase.

It has been found, however, that with this method the full potential of a possible saving cannot yet be exploited.

The object of the present invention is therefore to improve the pressure consumption for blow moulding machines of this type still further.

SUMMARY OF THE INVENTION

In the case of a method according to the invention for the shaping of plastics material pre-forms into plastics material containers, plastics material pre-forms are introduced into a blow mould or in each case into blow moulds respectively and are expanded to form the plastic bottles or plastics material containers respectively by being acted upon with a gaseous medium in the blow mould. In this case a preliminary blow moulding is first carried out by acting upon the plastics material pre-forms with a first pressure. After that, an intermediate blow moulding of the plastics material pre-forms is carried out at a second pressure which is higher than the first pressure. Finally a final blow moulding of the plastics material pre-forms is carried out at a third pressure which is higher than the second pressure.

According to the invention at least the second pressure is varied during a working operation. Whereas, as mentioned above, the preliminary blow moulding has a major influence upon the quality of the container, it has been possible to establish that the intermediate blow moulding pressure serves predominantly to reduce the air consumption. It has thus been determined that a variation in the intermediate blow moulding pressure has no such major influence upon the quality of the bottle. The pressure ducts of the preliminary blow moulding and of the intermediate blow moulding are preferably regulated themselves in this case, depending upon the pressure level of the individual annular ducts. Hitherto it was necessary for the marginal conditions or for the pressure level to be set by an operator himself or herself.

The level of the intermediate blow moulding pressure significantly influences the air consumption, in which case a prediction of the optimum is heavily dependent upon the process and until now could not be predicted in a reliable manner.

It is advantageous for at least the second pressure to be regulated at least in a manner dependent upon a further process variable (for example the consumption) during working operation. In contrast to the prior art no setting of the intermediate blow moulding pressure (or only a setting fixed by the user) is carried out, but this intermediate blow moulding pressure, i.e. in this case the second pressure, can be regulated in the scope for example of an optimization operation. According to the prior art, on the other hand, an optimum setting of this type is found difficult for the recycling process and this is not controlled even by numerous operators, so that many stretch blow moulding machines produce with a significantly excessive air consumption.

An essential concept of the invention thus lies in the fact that the intermediate blow moulding pressure is varied automatically according to a process setting found (in this case for example an air recycling can be activated by the operator) in order to settle the recycling in this way. The consumption of the gaseous medium is understood in particular in this case as being that portion of the gaseous medium which can no longer be fed back or recycled respectively. In this case it would be possible for this consumption to be determined for example with a flow meter.

In addition, it is possible for a pre-set characteristic, which is characteristic for example of the air consumption, to be stored. The intermediate blow moulding pressure or the second pressure respectively, by which the lowest air consumption is then generated, can preferably be taken over automatically.

It is advantageous for a measurement of the second pressure to be carried out at least for a time and it is particularly preferred for a continuous measurement of at least this second pressure to be carried out. In addition it would also be possible for the first and/or the third pressure also to be varied.

In the case of a further preferred method the plastics material containers are released after the final blow moulding or air is again released out of the containers. It is preferable for the final blow moulding pressure to be maintained for a pre-set period of time.

It is preferable for the pressure level after the final blow moulding to be reduced again to an intermediate blow moulding pressure at least for a time. It is advantageous for the first pressure or the preliminary blow moulding pressure respectively to be between 2 bar and 15 bar, preferably between 4 bar and 12 bar and in a particularly preferred manner between 4 bar and 10 bar. It is advantageous for the second pressure, i.e. the intermediate blow moulding pressure, to be between 8 bar and 40 bar, preferably between 12 bar and 20 bar. It is advantageous for the third pressure to be between 20 bar and 40 bar, preferably between 20 bar and 35 bar. In the case of a further preferred method the second pressure or the intermediate blow moulding pressure respectively can be varied with a pressure range which is between 3 bar and 20 bar, preferably between 5 bar and 15 bar.

It is advantageous for a correlation to be produced with the air consumption—in particular with reference to a pressure curve—in the blow moulding machine. The higher a pressure before the release of the stretch blow moulding machine or of the container respectively, the higher also the air consumption.

It is therefore preferable for the second pressure to be determined in a manner dependent upon the consumption of the gaseous medium. It is thus preferable for a regulating circuit to be provided which regulates the second pressure in a manner dependent upon a measured consumption.

In the case of a preferred method the level of the second pressure is determined, in which the consumption of the gaseous medium reaches a minimum. This second pressure can be used for the following working operation. A variation during a working operation is understood as being an operation of the machine in which containers are produced at least on a trial basis. In addition, however, a special teach-in or calibration mode of the plant may also be involved. In this way, the working operation also designates those operation situations in which a machine is set, is changed over to new containers or is set up otherwise.

In the case of a further advantageous method the consumption of the gaseous medium required for shaping the plastics material pre-form—in particular in a manner dependent upon the second pressure—is determined. In this case it is possible for the pressure to be varied within the regulation procedure and for the consumption of gaseous medium to be fixed in each case in a manner dependent upon this pressure.

As mentioned, a level of this air consumption is determined in this case. In this way, as mentioned above, the pressure is regulated in a manner dependent upon the consumption.

In the case of a further advantageous method a finished blow moulding of the plastics material containers is initiated when the second pressure exceeds a pre-set threshold value. It would now be possible for the regulation to result in the intermediate blow moulding pressure being estimated very high. In this case a threshold value is set from which the finished blow moulding stage is set in each case. In this way for example, it is possible to determine that the finished blow moulding is automatically activated when 95% of the nominal pressure is achieved during the intermediate blow moulding.

It is advantageous for a threshold value switch-over to be provided for the second pressure. It is thus preferable for a switch-over to take place from the second pressure to the third pressure when a specified threshold value of this intermediate blow moulding pressure is reached.

In the case of a further advantageous method the blow moulds or the containers respectively are conveyed along a pre-set conveying path during the expansion of the plastics material pre-forms and the second pressure is preferably also selected in a manner dependent upon a position of these blow moulds along the conveying path. In this way, it is possible for example for a switch-over to take place from the first pressure level to the second pressure level and/or from the second pressure level to the third pressure level from a specified position of the blow moulds by means of their conveying path in each case.

It is advantageous for the blow moulds or the blow moulding stations respectively, the component part of which is preferably also formed by the blow moulds, to be conveyed along a circular conveying path, for example by means of a blow moulding wheel. A checking of the respective angles, in which the respective method steps are initiated, is preferably carried out in this case. In this way, it is possible for example for the period of time or the angle, during which a recycling takes place, not to be further increased if a pressure equilibrium is already present between the reservoir in question and the residual pressure inside the container. In addition, it would be possible for no further increase to take place if, although a pressure equilibrium is not yet present, there is already approximately an equilibrium, for example the situation differs from an equilibrium by only 0.5 bar or less. Furthermore, it is also preferable for the maximum process angle along which a recycling takes place to be limited.

On account of the method according to the invention it is possible for the intermediate blow moulding also to be completely masked for the user and to be optimized only at the touch of a button in the context of the recycling. In addition, it would be possible for a correction variable to be displayed instead of an air consumption measurement appliance. A touchscreen for example could be used as a display device.

The present invention further relates to an apparatus for the shaping of plastics material pre-forms into plastics material containers. This apparatus has at least one blow mould or a blow moulding station respectively, inside which the plastics material pre-form is capable of being expanded by being acted upon with a gaseous medium. In addition, the apparatus has a stressing device which acts upon the plastics material pre-form with the gaseous medium, as well as a first pressure reservoir which provides the gaseous medium available for the preliminary blow moulding of the plastics material pre-form at a first pressure, and a second pressure reservoir which provides the gaseous medium for the intermediate blow moulding of the plastics material pre-form at a second pressure, the second pressure being higher than the first pressure, and with a third pressure reservoir which provides the gaseous medium for the final blow moulding of the plastics material pre-form at a third pressure, the third pressure being higher than the second pressure.

According to the invention the apparatus has a measuring instrument which determines at least one value which is characteristic of the consumption of the gaseous medium, and a control device which controls or changes respectively at least the second pressure in a manner dependent upon the consumption of the gaseous medium.

It is advantageous for this control device to be a regulating device which carries out a regulation of the second pressure in a manner dependent upon the consumption of the gaseous medium.

It is advantageous for the apparatus to have a carrier on which a plurality of blow moulds of this type are arranged. It is advantageous for this carrier to be designed in the form of a blow moulding wheel and for a plurality of blow moulding stations to be arranged on the latter. The blow moulds in this case are preferably component parts of this blow moulding station. It is advantageous for the individual blow moulding stations also to have stretching rods which extend the containers in the longitudinal direction thereof during the expansion thereof.

In this case it is also possible for a movement of these stretching rods to be altered in a manner dependent upon the pressure level mentioned above and/or in a manner dependent upon the consumption of the gaseous medium or the compressed air respectively. In this case too, a regulation would be possible, so that conversely a movement of the stretching rod is also taken into consideration during the setting of the pressure level.

In the case of a further advantageous design the apparatus has at least one valve device which is arranged between at least one pressure reservoir and the stressing device and which controls the supply of the gaseous medium to the plastics material pre-forms.

The stressing device can be for example a blow moulding nozzle which is preferably applied to an aperture of the plastics material pre-forms before the expansion.

It is advantageous for a plurality of valves to be provided which control the pressure supply, in particular also at different pressure levels. For this purpose each individual blow moulding station of the apparatus can have a valve block which in turn has this plurality of valves.

In the case of a further advantageous design at least part of the gaseous medium is capable of being returned or is fed back respectively from the plastics material containers into, at least into, a pressure reservoir. In this way it would be possible for compressed air to be allowed back again into the second and the first reservoir, which are under a lower pressure, for example after the final blow moulding.

It is advantageous for at least one pressure reservoir to be designed in the form of an annular line which supplies a plurality of blow moulding stations or shaping stations respectively with compressed air.

It is advantageous in this case for these individual shaping stations to have in each case the blow mould indicated here, and in addition, however, also other components, such as for example blow mould holding means, which can be unfolded and folded together respectively during the opening and closing. In addition, these shaping stations preferably also have stretching rod in each case for stretching the plastics material pre-forms.

In the case of a further advantageous design the apparatus also has—in particular per blow moulding station—outlets by way of which compressed air can be released to the environment. In addition, a silencer can also be provided in the region of this outlet in this case.

A measuring instrument is advantageous for measuring the air consumption in the flow connection to one of the aforesaid outlet lines, by way of which compressed air can be released to the environment.

It is advantageous for the apparatus also to have one or more pressure measuring instruments which measures or measure in each case the pressures used for the expansion of the containers. A processor device preferably also controls the pressure levels in a manner dependent upon these measured pressures.

BRIEF DESCRIPTION OF THE DRAWINGS

Further advantages and designs are evident from the accompanying drawings. In the drawings

DETAILED DESCRIPTION OF THE INVENTION

Figure 1:
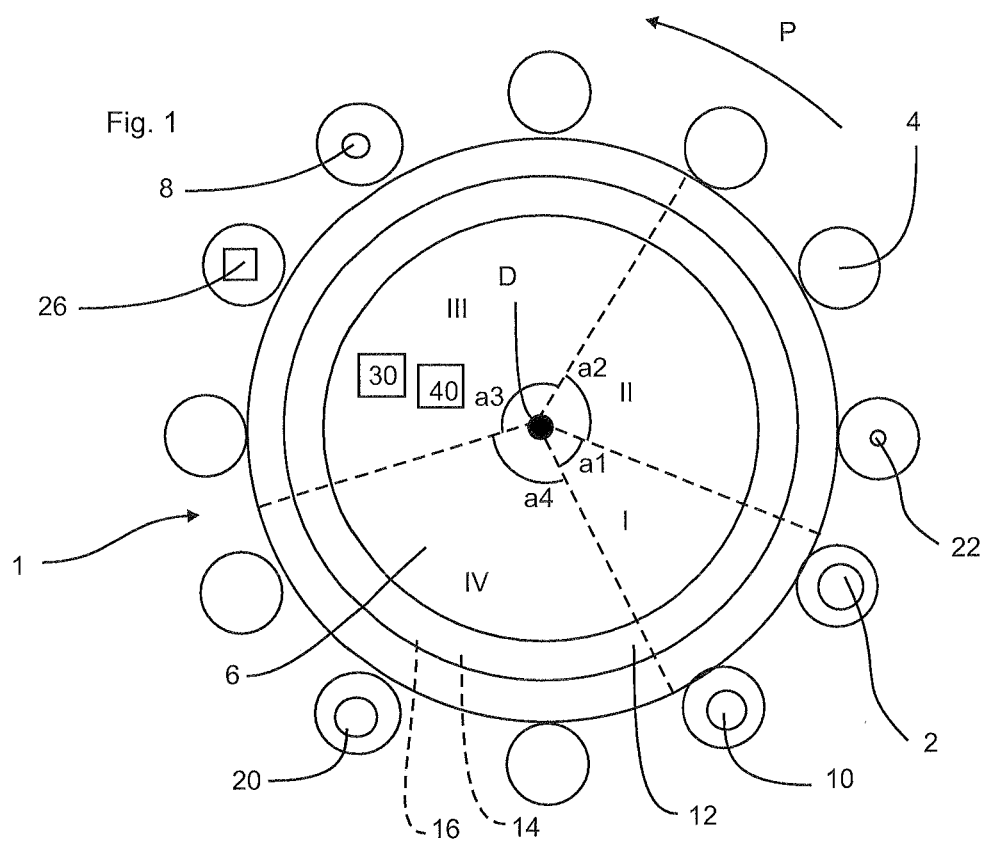
FIG. 1 shows a diagrammatic illustration of an apparatus according to the invention for the shaping of plastics material pre-forms into plastics material containers.

FIG. 1 shows in a roughly diagrammatic manner an apparatus 1 according to the invention for the shaping of plastics material pre-forms 10 into plastics material containers 20. In this case for example, plastics material pre-forms 10 are supplied to the apparatus 1 by way of a supply star wheel (not shown) and they are shaped into plastics material containers 20, during which the plastics material pre-forms are moved along a conveying path P. The apparatus 1 has in this case a carrier which is designated 6 as a whole and which is rotatable about its axis of rotation D and on which a plurality of blow moulding stations 4 are arranged. These blow moulding stations are arranged equidistantly in this case. Each individual blow moulding station 4 also has in this case a blow mould 2 which can be opened and closed and in the interior of which is formed a cavity inside which the plastics material pre-forms 10 are expanded to form the plastics material containers 20.

The reference number 22 designates in a roughly diagrammatic manner a stretching rod which stretches for stretching the plastics material pre-forms along their longitudinal direction which extends at a right angle to the plane of the figure in this case.

The reference number 12 designates a first pressure reservoir which is designed in the form of an annular duct in this case. Compressed air can be supplied to this pressure reservoir 12 from the outside for example by way of a compressor (not shown).

This compressed air reservoir 12 is connected to the individual blow moulding stations 4 by way of a connecting line (not shown) and it supplies compressed air to them in this way. In addition, as well as the compressed air reservoir 12, a second compressed air reservoir 14 and a third compressed air reservoir 16 are further provided, but they are not visible in this case since they are situated below the compressed air reservoir 12. The second compressed air reservoir 14 and the third compressed air reservoir 16 are supplied at least indirectly by a compressor and are likewise connected in terms of flow to the individual blow moulding stations or shaping stations 4 respectively.

The reference number 8 designates a stressing device which acts upon the plastics material pre-forms with the compressed air for their expansion. It is pointed out that only one stressing device 8 is illustrated in this case solely on grounds of visualization, but each blow moulding station has a stressing device 8 of this type and also a stretching rod 22 as well as also the blow mould 2.

The references I to IV designate different portions of a blow moulding procedure. In this case a preliminary blow moulding of the plastics material pre-forms is first carried out in a portion I, an intermediate blow moulding in a portion II and a final blow moulding in a portion III. This portion III is the longest portion in terms of time. A release takes place in a portion IV, in which compressed air can again escape from the plastics material containers and the latter can finally be removed from the blow moulds.

The reference number 30 designates in a roughly diagrammatic manner a consumption measuring device which determines the amount of the blow moulding air used. In this case it would be possible for each individual blow moulding station to have a consumption measuring device of this type. It would also be possible, however, for a central consumption measuring device to be provided which measures the total consumption of air with reference to all the blow moulding stations.

The reference number 40 designates a control device or a regulating device respectively which determines the intermediate blow moulding pressure pi in a manner dependent upon the air consumption measured. The reference number 26 designates a valve device which is likewise present at each individual blow moulding station and which preferably has a plurality of valves which control the supply of the gaseous medium or the blow moulding air respectively to the individual stressing devices or the individual plastics material pre-forms 10. This valve device can be designed in this case in the form of a valve block with a plurality of valves.

Figure 2:
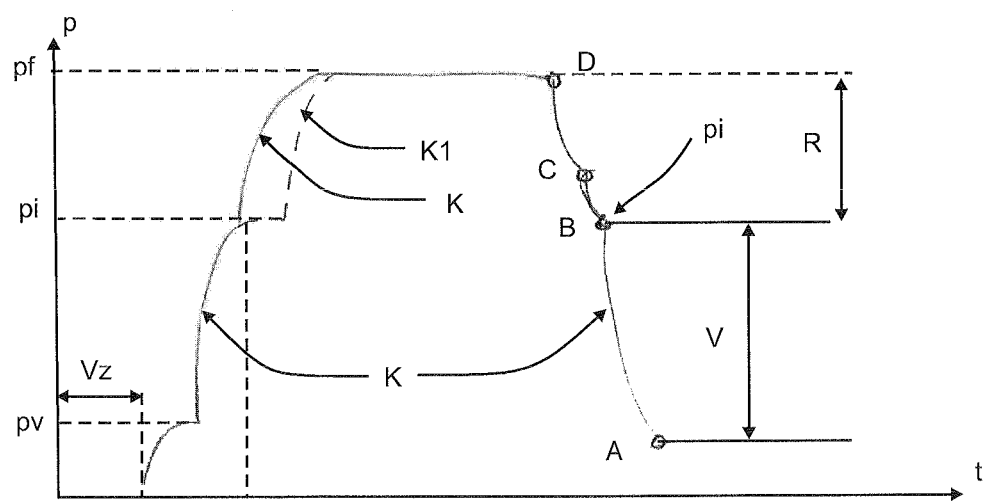
FIG. 2 shows an illustration of a curve pattern for stressing with compressed air.

FIG. 2 shows a pattern of a pressure curve K. In this case a pressure pv, namely the preliminary blow moulding pressure, is shown, a pressure pi (the intermediate blow moulding pressure, i.e. the second pressure mentioned above), and a pressure pf, i.e. the final blow moulding pressure. The reference letter V designates the air consumption which is given by the distance between pv and pi. The reference letter R designates the air or amount of pressure respectively which can be recycled by the air released again from the respective containers being returned to the respective pressure ducts or reservoirs 12, 14 at the lower compressed air level.

It will be seen that the amount of the air consumption and also the amount of the recycled air depend essentially upon the magnitude of the pressure pi at the point B. A higher pressure level of the pressure pi is shown at the point C, and this leads in this way to a higher air consumption and a lower amount of compressed air capable of being recycled.

The invention now proposes that this pressure pi should be set automatically whilst taking into consideration the air consumption. In the case of earlier machines this pressure level pi was pre-set by the user of the machines. In this case the corresponding input was masked in an input device, i.e. it cannot be carried out by the user. The point D designates the point from which a start is made again to release air from the containers since the shaping procedure is concluded.

It would also be possible, however, for an initial value pi to be pre-set by the user and for this then to be automatically regulated. In this case, however, it is also preferable to take into consideration the respective angles a1 to a4, which is determined in FIG. 1 by the portions I to IV. In the event that a corresponding recycling angle is too large, i.e. pi is selected to be too low on the other hand, the control device will ensure that the recycling angle or the stopping angle (i.e. the angle at which the recycling is terminated) respectively is not further increased. It is advantageous, as mentioned above, for a threshold-value switch-over to be present which at least when a specified threshold value is achieved activates the pressure level following in each case. In addition, it would be possible to set the time or the angle respectively from which a start is made with the final blow moulding or acting upon the containers with the pressure pf. This is indicated by the curve portion K1 shown in broken lines.

The control now varies the pi pressure in a purposeful manner and allows recycling to settle, in which case it is determined when air can be recycled for the most part. In other words, the pattern of an air outlet can be checked and if this is minimal, this results in the ideal air consumption. It is advantageous, however, for a plausibility check still to be carried out with reference to the recycling angle occurring in each case.

If, for example, the blow moulding curve pressure drops below the pressure pi in the preliminary blow moulding duct, possibly below this pressure plus a pre-set difference value which is preferably between 0.3 bar and 0.7 bar, or if the blow moulding curve pressure drops below the pressure of the pi annular duct, i.e. of the second reservoir 14 (likewise possibly plus a pre-set value which is between 0.3 bar and 0.7 bar, preferably at approximately 0.5 bar), then the respective recycling angle is not further increased.

It is preferably also possible for a proposed value for the second pressure pi to be issued or even, in a corresponding manner, a proposal for the respective angle, as illustrated in FIG. 1 or the recycling angle of the pressure pi.

In addition it is also possible for the starting point for the recycling, i.e. the time value of the point D in this case, to be set to the value of the maximum recycling R, possibly whilst deducting a specified degree range, such as for example from 1° to 3° and preferably 2°.

In addition, it would be possible for the pressure in the preliminary blow moulding duct, i.e. in the first reservoir 12, to be compared with the pressure at the point B or for the pressure in the second reservoir or the annular duct respectively, i.e. the second pressure PI, to be compared with the pressure at the point C. If the difference is smaller than 0.5 bar, the corresponding recycling angle is not increased further, since a greatly improved saving can no longer be expected [in] this way.

The point B thus characterizes the optimized intermediate pressure PI at which the maximum recycling is possible. This adaptation of the pressure pi thus takes place, as mentioned above, in the course of the working operation, possibly also a calibration operation. Below the pressure pv (or from the point A respectively) the container is completely released again and can be removed from the individual blow moulding stations 4. The reference letters Vz designate the delay time of the valves.

The Applicants reserve the right to claim all the features disclosed in the application documents as being essential to the invention, insofar as they are novel either individually or in combination as compared with the prior art.

LIST OF REFERENCES 1 apparatus
2 blow mould
4 blow moulding station
6 carrier
8 stressing device
10 plastics material pre-forms
12 first pressure reservoir
14 second pressure reservoir
16 third pressure reservoir
22 stretching rod
26 valve device
P conveying path
pv first pressure, preliminary blow moulding pressure
pi second pressure, intermediate blow moulding pressure
pf third pressure, final blow moulding pressure
A, B, C, D method points
I, II, III, IV method portions
a1, a2, a3, a4 angles
D axis of rotation
t time
p pressure
K blow moulding curve
K1 curve portion
Vz delay time

The invention claimed is:

1. A method for shaping plastics material pre-forms into plastics material containers, wherein the plastics material pre-forms are introduced into a blow mould and are expanded to form the plastic bottles by being acted upon with a gaseous medium in the blow mould, comprising the steps of:
   a preliminary blow moulding by acting upon the plastics material pre-forms with a first pressure;
   an intermediate blow moulding of the plastics material pre-forms at a second pressure which is higher than the first pressure; and
   a final blow moulding of the plastics material pre-forms at a third pressure which is higher than the second pressure, wherein
   at least the second pressure is regulated automatically according to gaseous medium to consumption.

2. The method according to claim 1, wherein the consumption of the gaseous medium required for shaping the plastics material pre-form is determined.

3. The method according to claim 2, wherein the second pressure is determined in a manner dependent upon the consumption of the gaseous medium.

4. The method according to claim 3, wherein the level of the second pressure is determined in which the consumption of the gaseous medium reaches a minimum.

5. The method according to claim 4, wherein the consumption of the gaseous medium required for shaping the plastics material pre-forms is determined in a manner dependent upon the second pressure.

6. The method according to claim 1, wherein the final blow moulding of the plastics material containers is initiated when the second pressure exceeds a pre-set threshold value.

7. The method according to claim 1, wherein the blow moulds are conveyed along a pre-set conveying path during the expansion of the plastics material pre-forms and the second pressure is selected in a manner dependent upon a position of the blow moulds along this conveying path.

8. The method according to claim 1, wherein the intermediate blow moulding pressure or the second pressure by which the lowest air consumption is generated, is taken over automatically.

9. The method according to claim 1, wherein measurement of the second pressure is carried out at least for a time as a continuous pressure measurement.

10. The method according to claim 1, wherein the first and/or the third pressures are varied.

11. A method for shaping plastics material pre-forms into plastics material containers, wherein the plastics material pre-forms are introduced into a blow mould and are expanded to form the plastic bottles by being acted upon with a gaseous medium in the blow mould, comprising the steps of:
   a preliminary blow moulding by acting upon the plastics material pre-forms with a first pressure;
   an intermediate blow moulding of the plastics material pre-forms at a second pressure which is higher than the first pressure; and
   a final blow moulding of the plastics material pre-forms at a third pressure which is higher than the second pressure, wherein
   at least the second pressure is varied during a working, and
   wherein the blow moulds are conveyed along a pre-set conveying path during the expansion of the plastics material pre-forms and the second pressure is selected in a manner dependent upon a position of the blow moulds along this conveying path.

12. The method according to claim 11, wherein the second pressure is regulated at least in a manner dependent upon a further process variable.

13. The method according to claim 12, wherein the further process variable comprises a gaseous medium consumption.

14. The method according to claim 13, wherein the gaseous medium consumption a portion of the gaseous medium which is not fed back to the process or recycled.

* * * * *